Jan. 11, 1927.

H. E. MAYNARD 1,613,669

CLUTCH PLATE

Filed March 13, 1925

INVENTOR
HOWARD. E. MAYNARD.
BY
ATTORNEY

Patented Jan. 11, 1927.

1,613,669

UNITED STATES PATENT OFFICE.

HOWARD E. MAYNARD, OF DETROIT, MICHIGAN, ASSIGNOR TO CHRYSLER CORPORATION, OF HIGHLAND PARK, MICHIGAN, A CORPORATION OF DELAWARE.

CLUTCH PLATE.

Application filed March 13, 1925. Serial No. 15,187.

In the construction of clutch plates, it is desirable that the plates be of as simple and economical construction as possible and at the same time, that their weight be kept at a minimum. It has resulted therefore that in many instances clutch plates are formed from sheet metal the gauge of which is usually such as to require a bending of the metal in order to provide a reinforcing and strengthening effect, particularly at the hub portion, which will tend to prevent distortion of the plate in service. It further very often happens that such reinforcements will render the plate in its outer portions, too stiff for efficient service, with the result that a clutch chatter is had.

It is therefore the primary object of my invention to provide a clutch plate of sheet metal, which may or may not be bent so as to be properly reinforced around its hub portion and which is provided with spaced slots in its outer portion which tend to take away the rigidity of the plate, adjacent the clutch facing and give to it a slight resiliency in order to prevent chatter of the clutch.

With the above and other objects in view, my invention consists of the arrangement, combination, and construction of the various parts of my improved device as described in my specification, claimed in my claims, and shown in the accompanying drawings, in which—

Figure 1:
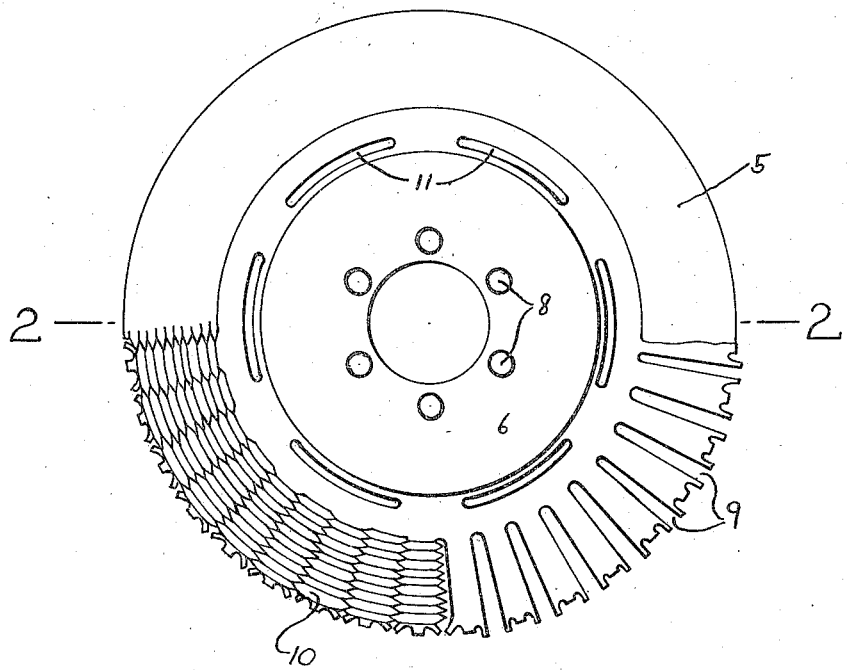
Fig. 1 is a plan view of my improved plate.
Figure 2:
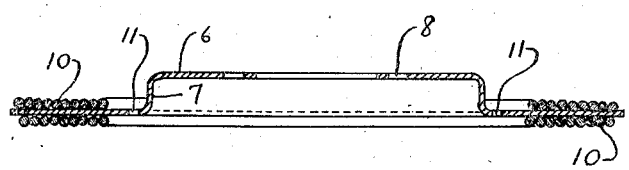
Fig. 2 is a central section thereof.

I have shown a sheet metal plate 5 having a centrally depressed portion 6 with a resulting annular reinforcement 7 between the portion 6 and the outer portion of the plate. A plurality of openings 8 are provided in the center portion of the plate for securing it in place when in use and a plurality of slots 9 are provided in the outer rim of the plate through which a woven facing 10 consisting of a plurality of strands of material, is secured to the plate.

Adjacent to the annular reinforcement 7 is a plurality of spaced slots 11 which are curved to form in combination, a circular formation around the reinforcement 7.

It has been found in practice that these slots 11 provide a flexibility for the plate sufficient to overcome clutch chatter in use and at the same time the plate will be held against harmful distortion such as would follow were the reinforcement 7 omitted in very light plates.

It will be obvious that various changes may be made in the arrangement, combination and construction of the various parts of my improved device without departing from the spirit of my invention, and it is my intention to cover by my claims such changes as may be reasonably included within the scope theerof.

What I claim is:

1. A clutch plate comprising a sheet metal member having an annular reinforcing bend therein and clutch facing thereon, apertures in said member for securing it to another element and spaced slots of long and narrow construction and of curved formation therein disposed intermediate said facing and said securing apertures, and adapted to impart flexibility to the plate.

2. A clutch plate comprising a sheet metal member having an annular clutch facing secured thereon, apertures near the center of said plate for securing it to another element, an annular reinforcing bend in said plate intermediate said facing and said securing apertures, and a plurality of spaced annularly disposed slots adjacent to said annular bend, said slots being of relatively long and of narrow construction and of curved formation.

3. A clutch plate consisting of a sheet metal member having an annular reinforcing bend therein, a clutch facing thereon and a plurality of spaced slots therein, said slots being of relatively long and narrow construction and of curved formation.

HOWARD E. MAYNARD.